(12) United States Patent
Ishihara

(10) Patent No.: US 6,795,224 B2
(45) Date of Patent: Sep. 21, 2004

(54) OPTICAL SCANNING APPARATUS AND IMAGE FORMING APPARATUS USING THE SAME

(75) Inventor: Keiichiro Ishihara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/686,656

(22) Filed: Oct. 17, 2003

(65) Prior Publication Data

US 2004/0080802 A1 Apr. 29, 2004

Related U.S. Application Data

(62) Division of application No. 10/022,546, filed on Dec. 20, 2001, now Pat. No. 6,665,103.

(30) Foreign Application Priority Data

Dec. 21, 2000 (JP) ........................................ 2000-388946

(51) Int. Cl.[7] .............................................. G02B 26/08
(52) U.S. Cl. ........................ 359/205; 359/196; 347/257; 347/259
(58) Field of Search ................................ 359/196–226, 359/662, 819; 347/242, 257–261

(56) References Cited

U.S. PATENT DOCUMENTS 5,953,042 A  9/1999 Nabete et al. .............. 347/263
6,411,325 B1  6/2002 Matsushita et al. .......... 347/257
6,512,533 B2  1/2003 Tajima et al. ................ 347/242

FOREIGN PATENT DOCUMENTS

JP         63048510 A  *  3/1988
JP         9-329755      12/1997

* cited by examiner

Primary Examiner—James Phan
(74) Attorney, Agent, or Firm—Fitzpatrick, Cella, Harper & Scinto

(57) ABSTRACT

An optical scanning apparatus includes a deflector for deflecting a beam emitted from a light source, and scanning optical system having at least one scanning lens for causing the beam deflected by the deflector means to be imaged on a surface to be scanned. At least one scanning lens constituting the scanning optical system has a plurality of positioning reference surfaces for effecting the positioning of the scanning lens in the direction of the optical axis thereof, and is disposed so that a straight line linking the points on two positioning reference surfaces together or a plane formed by the points on three or more positioning reference surfaces may be non-orthogonal to the optical axis. In a main scanning cross-section, the shape of the effective portion of the scanning lens is asymmetrical with respect to the optical axis.

7 Claims, 6 Drawing Sheets

OPPOSITE SIDE TO LIGHT SOURCE UNIT

LIGHT SOURCE UNIT SIDE

OPTICAL SCANNING APPARATUS AND IMAGE FORMING APPARATUS USING THE SAME

This application is a division of application Ser. No. 10/022,546, filed Dec. 20, 2001 now U.S. Pat. No. 6,665,103.

BACKGROUND OF THE INVENTION

1. Field of the Invention

This invention relates to an optical scanning apparatus and an image forming apparatus using the same, and is particularly suitable for a laser beam printer, a digital copier, a multifunction printer or the like having, for example, the electrophotographic process designed such that a light beam emitted from light source means is deflected by deflecting means, and a surface to be scanned is optically scanned through scanning optical means to thereby record image information.

2. Related Background Art

In the optical scanning apparatus of a laser beam printer, a digital copier or the like, a beam optically modulated and emitted from light source means in conformity with an image signal is periodically deflected by deflecting means comprising, for example, a polygon mirror, and is condensed into a spot-like shape on the surface of a photosensitive recording medium by scanning optical means having an fθ characteristic, and is optically scanned to thereby record image information.

FIG. 9 of the accompanying drawings is a schematic view of the essential portions of a conventional optical scanning apparatus. In FIG. 9, a divergent beam emitted from a light source unit 91 is converted into a substantially parallel beam by a collimator lens (not shown), and has its width limited by an aperture (not shown) and enters a cylindrical lens 92 having predetermined power only in a sub-scanning direction. The substantially parallel beam having entered the cylindrical lens 92, in a main scanning cross-section, emerges while keeping the state of the substantially parallel beam. Also, in a sub-scanning cross-section, it converges and is imaged as a substantially linear image on the deflecting surface (reflecting surface) 93a of a light deflector 93 comprising a polygon mirror. The beam reflected and deflected by the deflecting surface 93a of the light deflector 93 is directed to the surface 97 of a photosensitive drum as a surface to be scanned through scanning optical means (an fθ lens system) having first and second scanning lenses (fθ lenses) 95a and 95b having the fθ characteristic, and scans on the surface 97 of a photosensitive drum at a substantially constant speed by the light deflector 93 being rotated at a substantially equal angular speed by a polygon motor 94, to thereby effect the recording of image information.

The first and second scanning lenses 95a and 95b in FIG. 9 are strictly positioned relative to the optical path of the beam deflected by the light deflector 93, and thereafter are fixed to an optical box (housing), not shown, by a known method such as adhesive securing or spring hold-down.

The first and second scanning lenses 95a and 95b are generally inexpensive plastic lenses, and positioning reference surfaces 99a1, 99a2, 99b11, 99b12, 99b21 and 99b22 for positioning in the direction of an optical axis are provided on configurational portions 90a1, 90a2, 90b1 and 90b2, respectively, outside the effective lens areas thereof. That is, on the first scanning lens 95a, the positioning reference surfaces 99a1 and 99a2 are provided on the same plane as the configurational portions 90a1 and 90a2, respectively, and on the second scanning lens 95b, the two positioning reference surfaces 99b11, 99b12 and 99b21, 99b22 are protrudedly provided separately in the sub-scanning direction from the configurational portions 90b1 and 90b2, respectively.

These positioning reference surfaces 99a1, 99a2, 99b11, 99b12, 99b21 and 99b22 are brought into contact with the positioning pins of the optical box, not shown to thereby effect the positioning in the direction of the optical axis, whereby the deterioration of the curvature of image field on the surface 97 to be scanned and the deterioration of the uniformity of the scanning speed (fθ characteristic) is prevented.

Japanese Patent Application Laid-Open No. 09-329755 discloses an optical scanning apparatus in which a scanning lens is provided with a pair of positioning reference surfaces differing in height by a predetermined amount and these are brought into contact with the positioning portion of an optical box, whereby an optical box of the same specification can be applied over a wide range.

Incidentally, recently, with the demand for the compactness of the entire apparatus, the compactness of a scanning optical system as scanning optical means has been contrived and for example, as a method therefor, mention may be made of making the angle of field of the scanning optical system wider or disposing the scanning optical system near a light deflector.

On the other hand, when in an optical scanning apparatus of this type, a beam emitted from a light source is made to be incident on the deflecting surface of a light deflector from a oblique direction thereto in the main scanning cross-section, the position of the beam reflected and deflected by the deflecting surface becomes asymmetrical with respect to the optical axis of the scanning optical system. This asymmetry becomes greater as the angle of field becomes wider, and recently the effective diameter of a scanning lens constituting the scanning optical system and the shape thereof in the main scanning cross-section have also become great in the asymmetry thereof. Along therewith, the configurational portion outside the effective lens area of the scanning lens also becomes great in asymmetry and for example, in FIG. 9, to make a straight line linking the points on two positioning reference surfaces together or a plane formed by the points on three or more positioning reference surfaces orthogonal to the optical axis of the scanning optical system, the amount of protrusion (height) of at least one positioning reference surface must be made great.

The scanning lens, however, is generally a plastic lens, as described above, and when the amount of protrusion becomes great, there arises the problem that the moldability of the lens is aggravated and desired surface accuracy is not obtained.

Also, near the light deflector, there are disposed many members such as a driving motor, a motor substrate, not shown, and a cylindrical lens, and when the scanning lens is disposed near the light deflector, there also arises the problem that a positioning member on the optical box side cannot be disposed due to the physical interference with other member.

SUMMARY OF THE INVENTION

It is a first object of the present invention to provide an optical scanning apparatus in which a scanning lens can be positioned highly accurately without aggravating the surface accuracy of the positioning reference surface of the scanning lens, and an image forming apparatus using the same.

It is a second object of the present invention to provide an optical scanning apparatus in which a positioning reference surface is freely disposed such as contriving energy saving, whereby the degree of freedom of the disposition of a scanning lens can be enhanced, and an image forming apparatus using the same.

In one aspect of the invention, an optical scanning apparatus comprises deflecting means for deflecting a beam emitted from light source means, and scanning optical means having at least one scanning lens for causing the beam deflected by the deflecting means to be imaged on a surface to be scanned, wherein the at least one scanning lens constituting the scanning optical means has a plurality of positioning reference surfaces for effecting the positioning of the scanning lens in the direction of the optical axis thereof, and is disposed so that a straight line linking the points on two positioning reference surfaces together or a plane formed by the points on three or more positioning reference surfaces may be non-orthogonal to the optical axis, and in a main scanning cross-section, the shape of the effective portion of the scanning lens is asymmetrical with respect to the optical axis.

In further aspect of the forgoing optical scanning apparatus, the scanning lens of which the shape of the effective portion in the main scanning cross-section is asymmetrical with respect to the optical axis is such that the effective length thereof in the main scanning cross-section differs relative to the optical axis.

In further aspect of the forgoing optical scanning apparatus, the scanning lens of which the shape of the effective portion in the main scanning cross-section is asymmetrical with respect to the optical axis is such that the meridional shape thereof is asymmetrical with respect to the optical axis.

In further aspect of the forgoing optical scanning apparatus, the scanning lens of which the shape of the effective portion in the main scanning cross-section is asymmetrical with respect to the optical axis is such that the effective length thereof in the main scanning cross-section differs relative to the optical axis and the meridional shape thereof is asymmetrical with respect to the optical axis.

In further aspect of the forgoing optical scanning apparatus, there are a plurality of scanning lenses each of which the shape of the effective portion in the main scanning cross-section is asymmetrical with respect to the optical axis.

In further aspect of the forgoing optical scanning apparatus, the plurality of positioning reference surfaces disposed on the at least one scanning lens are provided such that the optical axis is interposed therebetween.

In further aspect of the forgoing optical scanning apparatus, the plurality of positioning reference surfaces disposed on the at least one scanning lens are provided on the end portions of the scanning lens with the optical axis interposed therebetween, and two or more of the positioning reference surfaces provided on the end portions of the scanning lens are provided separately from each other in a sub-scanning direction.

In further aspect of the forgoing optical scanning apparatus, the plurality of positioning reference surfaces are provided protrudingly from a configurational portion outside the effective lens portion of the scanning lens, and the amounts of protrusion of the plurality of positioning reference surfaces from the configuration portion are substantially equal to one another.

In further aspect of the forgoing optical scanning apparatus, the protruding positioning reference surfaces are cylindrically shaped.

In further aspect of the forgoing optical scanning apparatus, the ridgelines between the protruding positioning reference surfaces and the side surfaces of the protruding positioning reference surfaces are formed with a taper.

In further aspect of the forgoing optical scanning apparatus, the plurality of positioning reference surfaces are provided on a configurational portion outside the effective lens area of the scanning lens and are formed on the same plane as the configurational portion.

In further aspect of the forgoing optical scanning apparatus, the positioning reference surfaces are orthogonal to the optical axis.

In further aspect of the forgoing optical scanning apparatus, the scanning lens of which the shape of the effective portion in the main scanning cross-section is asymmetrical with respect to the optical axis is molded out of a plastic material.

In another aspect of the invention, an optical scanning apparatus comprises deflecting means for deflecting a beam emitted from light source means, and scanning optical means having at least one scanning lens for causing the beam deflected by the deflecting means to be imaged on a surface to be scanned, wherein the at least one scanning lens constituting the scanning optical means has a hollow portion in at least one of configurational portions outside an effective lens portion of the scanning lens with the optical axis thereof interposed therebetween, and a positioning reference surface for effecting the positioning of the scanning lens in the direction of the optical axis is formed on the hollow portion.

In further aspect of the forgoing optical scanning apparatus, the scanning lens does not have a hollow portion in the other configurational portion outside the effective lens portion with the optical axis interposed therebetween, and has a positioning reference surface on the other configurational portion outside the effective lens portion, and the positioning reference surface is formed on the same plane as the configurational portion.

In further aspect of the forgoing optical scanning apparatus, the scanning lens has a concave surface, and the positioning reference surface is formed on the concave surface side of the scanning lens.

In further aspect of the forgoing optical scanning apparatus, the positioning reference surface is formed on a surface opposite to an ejector pin.

In further aspect of the forgoing optical scanning apparatus, the scanning lens is molded out of a plastic material.

In another aspect of the invention, an image forming apparatus comprises the foregoing optical scanning apparatus, a photosensitive member disposed on the surface to be scanned, a developing device for developing an electrostatic latent image formed on the photosensitive member by the beam scanned by the optical scanning apparatus as a toner image, a transferring device for transferring the developed toner image to a transferring material and a fixing device for fixing the transferred toner image on the transferring material.

In another aspect of the invention, an image forming apparatus comprises the foregoing optical scanning apparatus and a printer controller for converting code data inputted from an external device into an image signal and inputting it to the optical scanning apparatus.

DESCRIPTION OF THE PREFERRED EMBODIMENTS (Embodiment 1)

Figure 1:
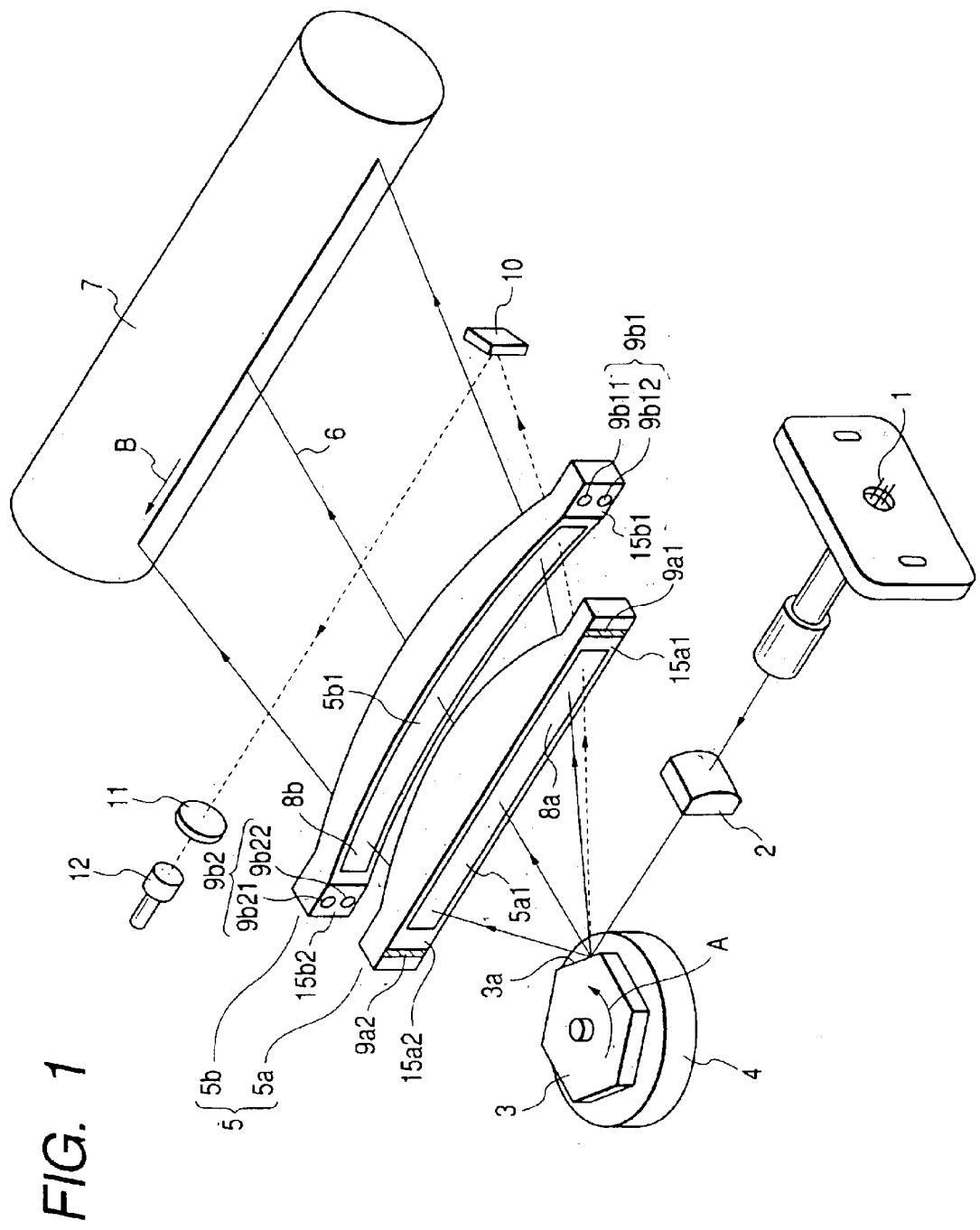
FIG. 1 is a schematic view of the essential portions of Embodiment 1 of the present invention.

FIG. 1 is a schematic view of the essential portions of an optical scanning apparatus according to Embodiment 1 of the present invention.

Herein, the main scanning direction refers to a direction in which a beam is deflected and scanned by a light deflector, and the sub-scanning direction refers to a direction containing the optical axis of scanning optical means and orthogonal to the main scanning direction.

In FIG. 1, reference numeral 1 designates a light source unit having a semiconductor laser as light source means, a collimator lens (condensing lens) for converting a divergent beam emitted from the semiconductor laser into a substantially parallel beam, and an aperture or the like for shaping the incident beam into an optimum beam shape.

Reference numeral 2 denotes a cylindrical lens which has predetermined power only in the sub-scanning direction, and causes the beam emitted from the light source unit 1 to be imaged as a substantially linear image in the sub-scanning cross-section on the deflecting surface (reflecting surface) 3a of a light deflector 3 which will be described later. The collimator lens, the aperture and the cylindrical lens 2 constitute the elements of incidence optical means.

Reference numeral 3 designates a light deflector as deflecting means comprising, for example, a polygon mirror (rotary polygon mirror), and rotated at a constant speed in the direction of arrow A by driving means 4 such as a driving motor.

Reference numeral 5 denotes scanning optical means (as fθ lens system) having the condensing function and the fθ characteristic, and having first and second scanning lenses (plastic fθ lenses) 5a and 5b made of molded synthetic resin (plastic), and having the inclination correcting function by causing a beam based on image information reflected and deflected by the light deflector 3 to be imaged on the surface 7 of a photosensitive drum as a surface to be scanned, and making the deflecting surface 3a of the light deflector 3 and the surface 7 to be scanned optically conjugate with each other in the sub-scanning cross-section.

In the present embodiment, the first scanning lens 5a comprises a spherical lens, a cylindrical lens or a toric lens, and the second scanning lens 5b comprises a toric lens or a cylindrical lens.

The first and second scanning lenses 5a and 5b are formed so that the effective portions (effective lengths) 8a and 8b thereof in the main scanning cross-section may differ from each other with respect to an optical axis 6 and the shapes (meridional shapes) thereof in the main scanning cross-section may be symmetrical with respect to the optical axis 6.

The first scanning lens 5a has a pair of positioning reference surfaces 9a1 and 9a2 on its surface facing the light deflector 3 with the optical axis 6 interposed therebetween.

The second scanning lens 5b has a pair of positioning reference portions 9b1 and 9b2 on its surface facing the light deflector 3 with the optical axis 6 interposed therebetween, and these positioning reference portions 9b1 and 9b2 have two positioning reference surfaces 9b11, 9b12 and 9b21, 9b22, respectively, separate in the sub-scanning direction.

The second scanning lens 5b in the present embodiment is disposed so that a straight line linking the points on the two positioning reference surfaces 9b11 and 9b21 (9b12 and 9b22) together or a plane formed by the points on the three or more positioning reference surfaces (three or more of 9b11, 9b12, 9b21 and 9b22) may be non-orthogonal to the optical axis 6.

That is, the second scanning lens 5b is such that the positioning reference portion 9b1 and the positioning reference portion 9b2 are disposed on different levels in the direction of the optical axis of the scanning lens.

Reference numeral 7 designates the surface of a photosensitive drum (the surface of an image bearing member) as a surface to be scanned, and reference characters 8a and 8b denote effective portions (effective lens areas).

Reference numeral 10 designates a reflecting mirror (hereinafter referred to as the "BD mirror") which reflects a synchronizing signal detecting beam (BD beam) for adjusting the timing of the scanning starting position on the surface 7 of the photosensitive drum to a synchronism detecting element 12 side which will be described later.

Reference numeral 11 denotes an imaging lens (hereinafter referred to as the "BD lens") of which the refractive power is set so that the surface of the synchronism detecting element 12 and the surface of the BD mirror 10 may be in substantially conjugate relationship with each other.

Reference numeral 12 designates an optical sensor (hereinafter referred to as the "BD sensor") as a synchronism detecting element, and in the present embodiment, the timing of the scanning starting position of image recording onto the surface 7 of the photosensitive drum is adjusted by the use of a synchronizing signal (BD signal) obtained by detecting an output signal from the BD sensor 12.

The elements such as the BD mirror 10, the BD lens 11 and the BD sensor 12 constitutes the elements of synchronizing position detecting means (a BD optical system).

In the present embodiment, the beam emitted from the light source unit 1 is converted into a substantially parallel beam by the collimator lens (not shown) in the light source unit 1, and has the size of its beam cross-section limited by the aperture (not shown), and enters the cylindrical lens 2. The substantially parallel beam having entered the cylindrical lens 2, in the main scanning cross-section, emerges in its intact state. At this time, it enters from an oblique direction to the deflecting surface 3a of the light deflector 3. Also, in the sub-scanning cross-section, it converges and is imaged as a substantially linear image (a linear image long in the main scanning direction) on the deflecting surface 3a of the light deflector 3. The beam reflected and deflected by the deflecting surface 3a of the light deflector 3 is imaged as a spot shape on the surface 7 of the photosensitive drum through the first fθ lens 5a and the second fθ lens 5b, and optically scans on the surface of the photosensitive drum at a uniform speed in the direction of arrow B (the main scanning direction) by the light deflector 3 being rotated in the direction of arrow A. Thereby, image recording is effected on the surface 7 of the photosensitive drum as a recording medium.

At this time, in order to adjust the timing of the scanning starting position on the surface 7 of the photosensitive drum before scanning on the surface 7 of the photosensitive drum, part of the beam reflected and deflected by the light deflector 3 is directed to the BD sensor 12 through the intermediary of the BD mirror 10 and the BD lens 11. The timing of the scanning starting position of image recording onto the surface 7 of the photosensitive drum is adjusted by the use of the synchronizing signal (BD signal) obtained by detecting the output signal from the BD sensor 12.

Here, description will be made of means for positioning the first and second scanning lenses 5a and 5b highly accurately without aggravating the surface accuracy of the plurality of positioning reference surfaces 9a1, 9a2, 9b11, 9b12, 9b21 and 9b22.

In the present embodiment, as described above, two positioning reference surfaces 9a1 and 9a2 for effecting the positioning in the direction of the optical axis are provided on the lens surface 5a1 of the polygon mirror side of the first scanning lens 5a with the optical axis 6 interposed therebetween. These positioning reference surfaces 9a1 and 9a2 are provided on the configurational portions 15a1 and 15a2 respectively, outside the effective lens area of the first scanning lens 5a, and are formed on the same plane as the configurational portions 15a1 and 15a2.

Also, in the present embodiment, as described above, four positioning reference surfaces 9b11, 9b12 and 9b21, 9b22 for effecting the positioning in the direction of the optical axis are provided on the lens surface 5b1 of the polygon mirror side of the second scanning lens 5b with the optical axis 6 interposed therebetween. These positioning reference surfaces 9b11, 9b12 and 9b21, 9b22 are provided on the configurational portions 15b1 and 15b2, respectively, outside the effective lens area of the second scanning lens 5b, and are of a cylindrical shape (having a circular cross-sectional shape) protruding from the configurational portions 15b1 and 15b2.

The positioning reference surfaces (9b11, 9b12, 9b21, 9b22) are individually orthogonal to the optical axis.

In the present embodiment, the second scanning lens 5b is disposed so that a straight line linking the points on the two positioning reference surfaces 9b11 (9b12) and 9b21 (9b22) together or a plane formed by the points on three or more positioning reference surfaces (three or more of 9b11, 9b12, 9b21 and 9b22) may be non-orthogonal to the optical axis 6.

In the present embodiment, these positioning reference surfaces 9a1, 9b2, 9b11, 9b12, 9b21 and 9b22 are brought into contact with the positioning pins of the optical box (housing), not shown, to thereby effect the positioning of the first and second scanning lenses 5a and 5b in the direction of the optical axis and the suppression of the rotational eccentricity about an axis parallel to the main scanning direction.

In the present embodiment, in order to achieve the compactness of the entire apparatus, the scanning angle of field is made as wide as ±48°. Also, by disposing the scanning optical means 5 in proximity to the polygon mirror 3, the further compactness of the entire apparatus is achieved.

Figure 2:
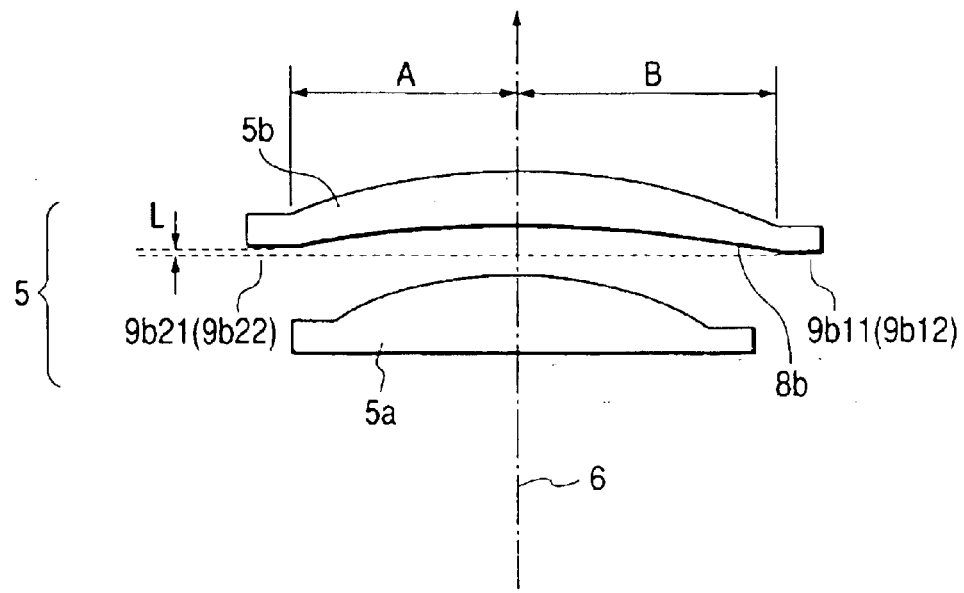
FIG. 2 is a main scanning cross-sectional view of Embodiment 1 of the present invention.

FIG. 2 is a cross-sectional view (main scanning cross-sectional view) of the essential portions of the scanning optical means in the main scanning direction. In FIG. 2, the same elements as the elements shown in FIG. 1 are given the same reference characters.

The effective portion (effective length) 8b of the second scanning lens 5b in the present embodiment in the main scanning cross-section is formed differently with respect to the optical axis 6, and for example, is formed so that the length B on the light source unit 1 side may be greater than the length A on the counter-light source unit 1 side. The meridional shape of the second scanning lens 5b, as described above, is formed so as to be symmetrical with respect to the optical axis 6, but the effective length 8b is different relative to the optical axis 6 and therefore, if attempt is made to provide the positioning reference surfaces 9b11, 9b12, 9b21 and 9b22 at the same position in the direction of the optical axis, it becomes necessary to make the amount of protrusion of the positioning reference surfaces 9b21 and 9b22 on the counter-light source unit 1 side greater by a length L indicated in FIG. 2 than that of the positioning reference surfaces 9b11 and 9b12 on the light source unit 1 side.

The second scanning lens 5b, however, is a plastic lens molded by injection molding, and if there is present a member protruding greatly from the configurational portion, there arises the problem that moldability is aggravated and the surface accuracy of the positioning reference surfaces 9b11, 9b12, 9b21 and 9b22 is deteriorated.

Figure 3:
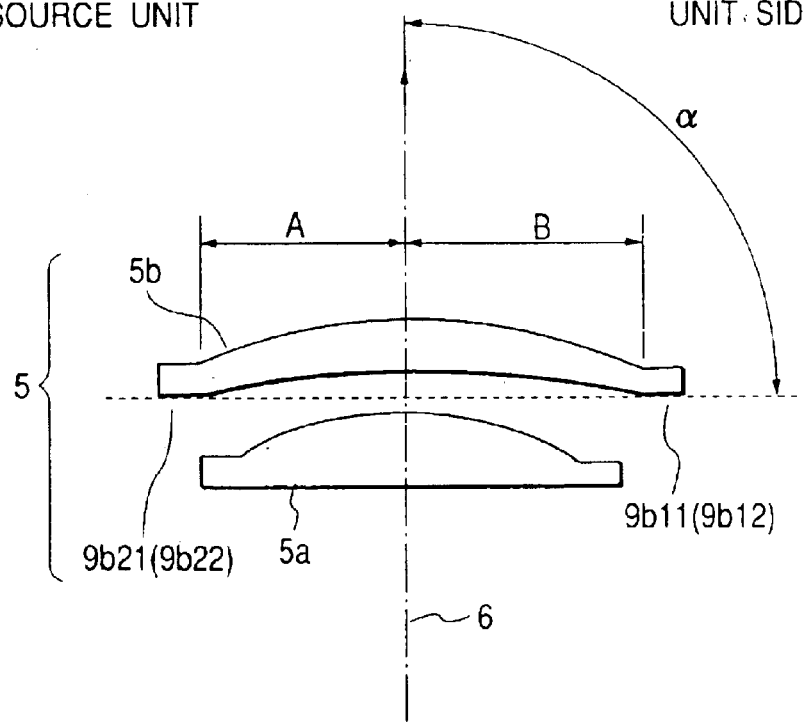
FIG. 3 is a main scanning cross-sectional view of Embodiment 1 of the present invention.

So, in the present embodiment, as shown in FIG. 3, the second scanning lens 5b is disposed so that a straight line linking the points on the two positioning reference surfaces 9b11 (9b12) and 9b21 (9b22) with the optical axis 6 interposed therebetween together or a plane formed by the points on three or more positioning reference surfaces (three or more of 9b11, 9b12, 9b21 and 9b22) may be non-orthogonal to the optical axis 6 as previously described so that the amount of protrusion of the positioning reference surfaces 9b11, 9b12, 9b21, 9b22 from the second scanning lens 5b may be constant. Thereby, the above-noted problem is solved.

In FIG. 3, α is the angle formed between the above-mentioned straight line or plane and the optical axis 6, and α≠90°. Thus, the projections such as the positioning reference surfaces 9b11, 9b12, 9b21 and 9b22 are not uselessly protruded from the configurational portions 15b1 and 15b2 of the second scanning lens 5b, and the surface accuracy of the positioning reference surfaces 9b11, 9b12, 9b21 and 9b22 can be kept good and the second scanning lens 5b can be positioned highly accurately.

Figure 4C:
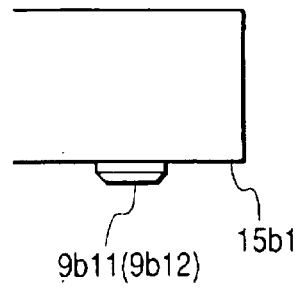
FIGS. 4A, 4B and 4C show the positioning reference surface of an optical scanning apparatus according to Embodiment 1 of the present invention.
Figure 4A:
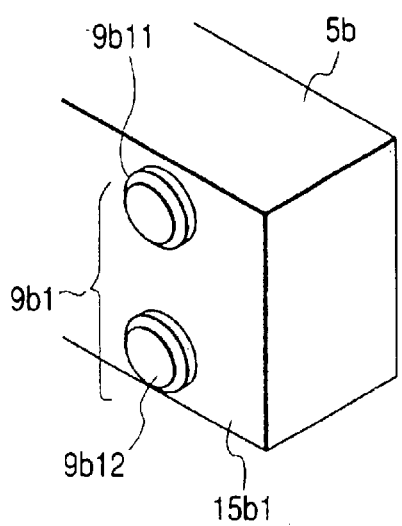
Figure 4B:
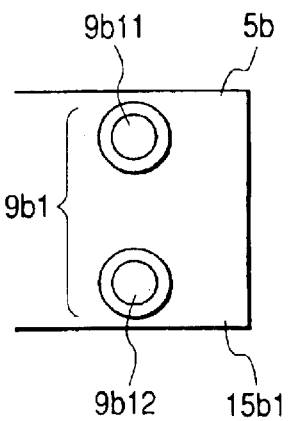

FIGS. 4A, 4B and 4C are schematic views of the essential portions of the positioning reference portion 9b1 provided on the configurational portion 15b1 of the light source unit side of the second scanning lens 5b in the present embodiment, FIG. 4A being a perspective view of the positioning reference portion 9b1, FIG. 4B being a front view thereof, and FIG. 4C being a top plan view thereof. The positioning reference portion 9b2 provided on the configurational portion 15b2 on the counter-light source unit 1 side is also of similar construction.

So, in the present embodiment, as shown in FIGS. 4A and 4B, the two positioning reference surfaces 9b11 and 9b12 are arranged separately from each other in the sub-scanning direction, and the shape thereof is made into a cylindrical shape protruding from the configurational portion 15b1 as previously described, and further the ridgelines between the positioning reference surfaces (9b11, 9b12) and the side surfaces of these positioning reference surfaces (9b11, 9b12) are formed with a taper. Thereby, the bulging of the positioning reference surfaces (9b11, 9b12) occurring during molding and the burr of the ridgelines between the positioning reference surfaces (9b11, 9b12) and the side surfaces of these positioning reference surfaces (9b11, 9b12) are suppressed so that the positioning reference surfaces (9b11, 9b12) can reliably abut against contact with the reference pins of the optical box.

While in the present embodiment, two positioning reference surfaces are provided in the sub-scanning direction, this is not restrictive, but one or three or more positioning reference surfaces may be provided.

Thus, according to the effect of the present embodiment, the beam can be imaged with a desired spot diameter at a desired position on the surface 7 of the photosensitive drum, whereby good images can always be obtained.

As a modification of the present embodiment, the present invention can also be applied to an optical scanning apparatus having scanning optical means having two or more scanning lenses like the second scanning lens 5b of the present invention.

While in the present embodiment, the first scanning lens 5a is provided with the positioning reference surfaces 9a1, 9b2 and the second scanning lens 5b is provided with the positioning reference portions 9b1, 9b2, a converse construction may be adopted or the first and second scanning lenses 5a and 5b may be provided with the same positioning reference surfaces or the same positioning reference portions.

(Embodiment 2)

Figure 5:
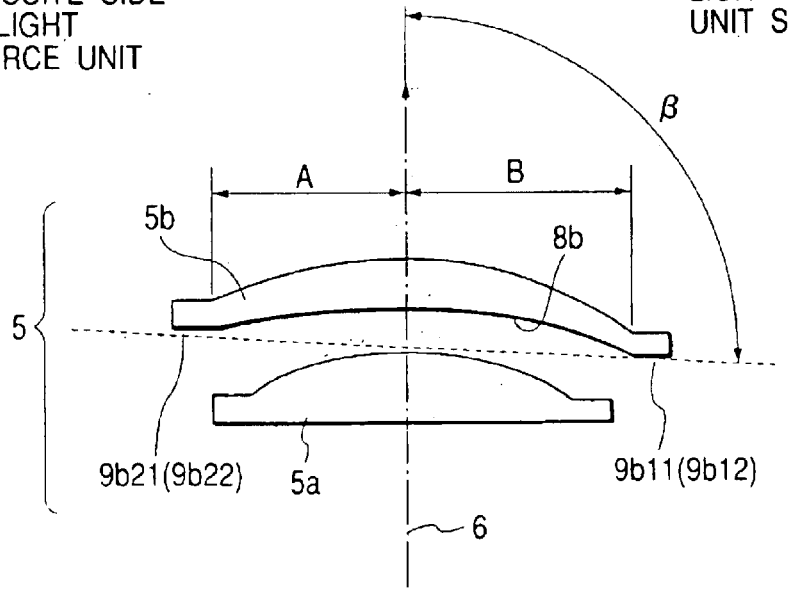
FIG. 5 is a main scanning cross-sectional view of Embodiment 2 of the present invention.

FIG. 5 is a cross-sectional view (main scanning cross-sectional view) of the essential portions of scanning optical means according to Embodiment 2 of the present invention in the main scanning direction. In FIG. 5, the same elements as the elements shown in FIG. 3 are given the same reference characters.

The difference of the present embodiment from the aforedescribed Embodiment 1 is that the meridional shape of the second scanning lens 5b is asymmetrical with respect to the optical axis 6. The other construction and optical action of the present embodiment are substantially similar to those of Embodiment 1, whereby a similar effect is obtained.

That is, the second scanning lens 5b, as in Embodiment 1, has its effective length 8b in the main scanning cross-section formed differently relative to the optical axis 6. Consequently, the length B on the light source unit 1 side is greater than the length A on the counter-light source unit 1 side. Also, the meridional shape of the second scanning lens 5b is asymmetrical with respect to the optical axis 6 and therefore, if an attempt is made to provide the positioning reference surfaces 9b11, 9b12, 9b21 and 9b22 at the same position in the direction of the optical axis, it is necessary to make the amount of protrusion of the positioning reference surfaces 9b21, 9b22 on the counter-light source unit 1 side still greater than that of the positioning reference surfaces 9b11, 9b12 on the light source unit 1 side. This will further deteriorate the surface accuracy of the positioning reference surfaces 9b11, 9b12, 9b21 and 9b22 and poses a problem.

So, in the present embodiment, as in the aforedescribed Embodiment 1, the second scanning lens 5b is disposed so that a straight line linking the points on the two positioning reference surfaces 9b11 (9b12) and 9b21 (9b22) with the optical axis interposed therebetween together or a plane formed by the points on three or more positioning reference surfaces (three or more of 9b11, 9b12, 9b21 and 9b22) may be non-orthogonal to the optical axis 6.

In FIG. 5, β is the angle formed between the above-mentioned straight line or plane and the optical axis 6, and β (>α)≠90°. Thus, the projections such as the positioning reference surfaces 9b11, 9b12, 9b21, and 9b22 are not uselessly protruded from the configurational portions 15b1 and 15b2 of the second scanning lens 5b, and the surface accuracy of the positioning reference surfaces 9b11, 9b12, 9b21 and 9b22 can be kept good and the second scanning lens 5b can be positioned highly accurately.

Also, in the present embodiment, it becomes possible to dispose the positioning reference surfaces 9b11, 9b12, 9b21 and 9b22 while avoiding any physical interference of the second scanning lens 5b with the members around it, and it is also possible to improve the degree of freedom of the disposition of the second scanning lens 5b. Thereby, an effect higher than that of the aforedescribed Embodiment 1 is obtained, and the second scanning lens 5b can be positioned highly accurately without the surface accuracy of the positioning reference surfaces 9b11, 9b12, 9b21 and 9b22 being aggravated, and good images can always be obtained.

As a modification of the present embodiment, the first scanning lens 5a and the second scanning lens 5b may be of a form in which the effective length thereof in the main scanning cross-section is equal with respect to the optical axis and the meridional shape thereof is asymmetrical with respect to the optical axis.

(Embodiment 3)

Figure 6:
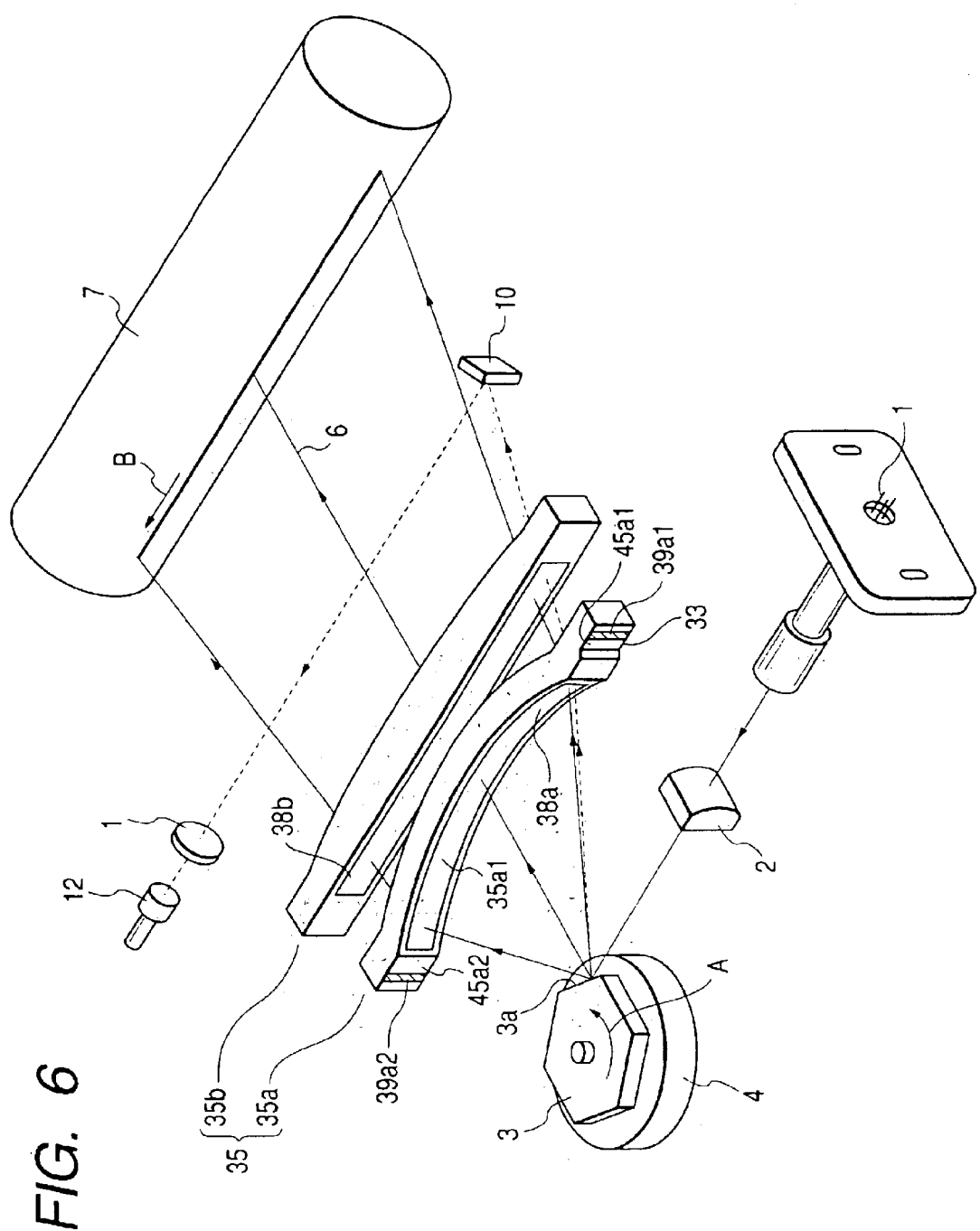
FIG. 6 is a schematic view of the essential portions of Embodiment 3 of the present invention.
Figure 7:
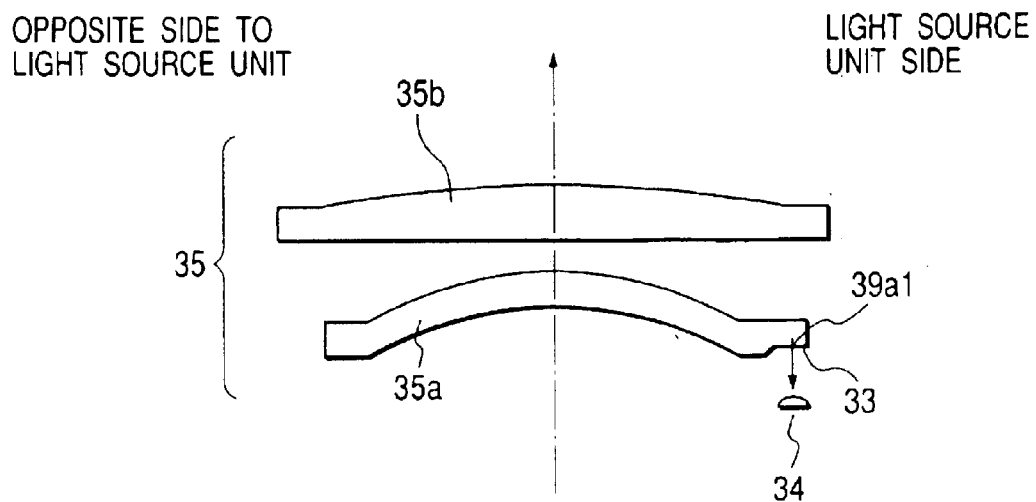
FIG. 7 is a main scanning cross-sectional view of Embodiment 3 of the present invention.

FIG. 6 is a schematic view of the essential portions of an optical scanning apparatus according to Embodiment 3 of the present invention, and FIG. 7 is a cross-sectional view (main scanning cross-sectional view) of the essential portions of the scanning optical means shown in FIG. 6 in the main scanning direction. In FIGS. 6 and 7, the same elements as the elements shown in FIG. 1 are given the same reference characters.

In FIGS. 6 and 7, reference numeral 35 designates scanning optical means (an fθ lens system) having the condensing function and the fθ characteristic, and having first and second scanning lenses (plastic fθ lenses) 35a and 35b made of molded synthetic resin (made of plastic), and having the inclination correcting function by causing a beam based on image information reflected and deflected by the light deflector 3 to be imaged on the surface 7 of the photosensitive drum as the surface to be scanned, and making the deflecting surface 3a of the light deflector 3 and the surface 7 to be scanned optically conjugate with each other in the sub-scanning cross-section.

The first and second scanning lenses 35a and 35b may be of a form in which the effective portions (effective lengths) 38a and 38b thereof in the main scanning cross-section are formed so as to be equal to each other relative to the optical axis 6 and the shape (meridional shape) thereof in the main scanning cross-section is formed so as to be symmetrical with respect to the optical axis 6, or the first and second scanning lenses 35a and 35b may be of a form in which the effective portions (effective lengths) 38a and 38b thereof in the main scanning cross-section are formed so as to differ from each other relative to the optical axis 6 and the shape (meridional shape) thereof in the main scanning cross-section is formed so as to be asymmetrical with respect to the optical axis 6.

The first scanning lens 35a is of a meniscus shape having its concave surface facing the polygon mirror 3 side, and has a hollow portion 33 in an outer diameter, portion 45a1 facing the polygon mirror 3 outside the effective lens scanning area on the light source unit 1 side with the optical axis 6 interposed therebetween, and a positioning reference surface 39a1 comprising a flat surface is formed in the hollow portion 33.

Also, the first scanning lens 35a has a positioning reference surface 39a2 on an outer diameter portion 45a2 facing the polygon mirror 3 outside the effective lens scanning area on the counter-light source unit 1 side with the optical axis 6 interposed therebetween. This positioning reference surface 39a2, as in the aforedescribed Embodiment 1, is formed on the same plane as a configurational portion 45a2. In the present embodiment, these positioning reference surfaces 39a1 and 39a2 are formed on the same side as a lens surface (concave surface) 35a1 opposite to an ejector pin.

The optical action of the optical scanning apparatus according to the present embodiment is similar to that of the aforedescribed Embodiment 1.

In the present embodiment, the positioning reference surface 39a1 is brought into contact with the positioning pin 34 (see FIG. 7) of the optical box and the positioning reference surface 39a2 is brought into contact with the positioning pin (not shown) of the optical box to thereby effect the positioning of the first scanning lens 35a in the direction of the optical axis and the suppression of the eccentricity of the rotation thereof about an axis parallel to the main scanning direction.

The positioning reference surfaces (39a1, 39a2) are individually orthogonal to the optical axis.

In the present embodiment, as in the aforedescribed Embodiment 1, in order to achieve the downsizing of the entire apparatus, the scanning angle of field is made as wide as ±48°. Also, the scanning a optical means 35 is disposed in proximity to the polygon mirror 3 to thereby achieve further compactness of the entire apparatus.

Heretofore, in the optical scanning apparatus, a motor, a polygon rotor and a motor substrate, not shown, have been disposed near the polygon mirror 3, and this has led to the problem that there is no space for disposing therein the positioning pin 34 provided upright on the optical box.

So, in the present embodiment, as described above, the hollow portion 33 is provided in the configurational portion 45a of the first scanning lens 35a at the light source unit side, and the positioning reference surface 39a1 is formed on a portion of the hollow portion 33 to thereby prevent the positioning reference surface 39a1 from protruding from the hollow portion 33.

That is, in the present embodiment, design is made such that when the positioning reference surface 39a1 is to be brought into contact with the positioning pin 34 to thereby position the first scanning lens 35a, the positioning pin 34 fits in the hollow portion 33 of the first scanning lens 35a, whereby it is made possible to accurately position and dispose the first scanning lens 35a even in the vicinity of the polygon mirror 3 wherein there is little space.

Further in the present embodiment, that lens surface of the first scanning lens 35a at the polygon mirror side is formed by a concave surface, and the concave surface faces toward the polygon mirror 3 side and therefore, the positioning reference surface 39a1 is provided on the concave surface side, whereby a higher effect is obtained.

The first scanning lens 35a, in case of the injection molding thereof, is taken out of a metal mold by the lens surface thereof at the photosensitive drum surface side being pushed by the ejector pin. In the present embodiment, as described above, the positioning reference surfaces 39a1 and 39a2 are formed on the same side as the concave surface opposite to the ejector pin, whereby the surface accuracy of the positioning reference surfaces 39a1 and 39a2 can be improved and the first scanning lens 35a can be disposed at a free position and therefore, can be positioned highly accurately. Further, according to the effect of the present embodiment, a desired spot diameter can be formed at a desired position on the surface 7 of the photosensitive drum 7 and good images can always be obtained.

While in the present embodiment, the hollow portion 33 is provided in the configurational portion 45a1 of the first scanning lens 35a at the light source unit side and the positioning reference surface 39a1 is formed on a portion of this hollow portion 33, this is not restrictive, but hollow portions may be provided in both configurational portions 45a1 and 45a2 and a positioning reference surface may be formed on a portion of each of the hollow portions. Further, a hollow portion may be provided not only in the configurational portion of the first scanning lens 35a but also in the configurational portion of the second scanning lens 35b, and a positioning reference surface may be formed on a portion thereof.

Also, while in each of Embodiments 1, 2 and 3, the scanning optical means is comprised of two scanning lenses, this is not restrictive, but the scanning optical means may be comprised of a single scanning lens or three or more scanning lenses.

(Image Forming Apparatus)

Description will now be made of an image forming apparatus to which the present invention is applied.

Figure 8:
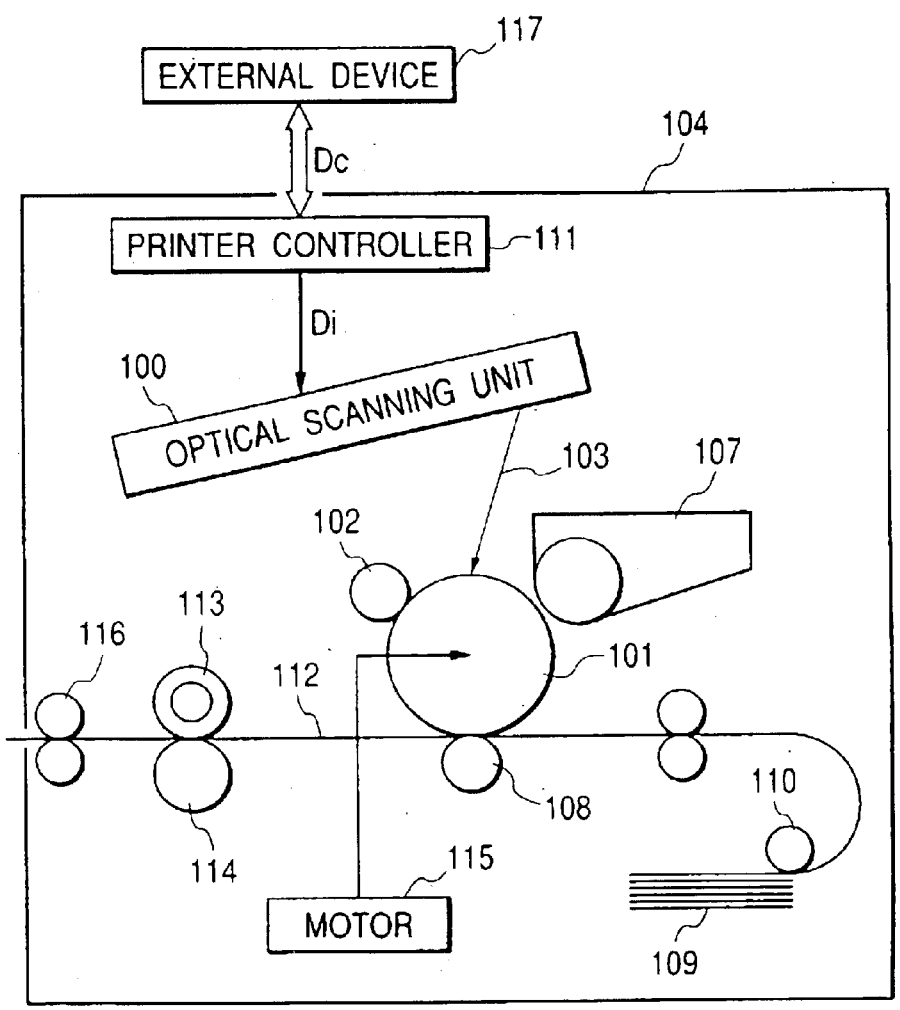
FIG. 8 is a schematic view showing the essential portions of the image forming apparatus of the present invention.
Figure 9:
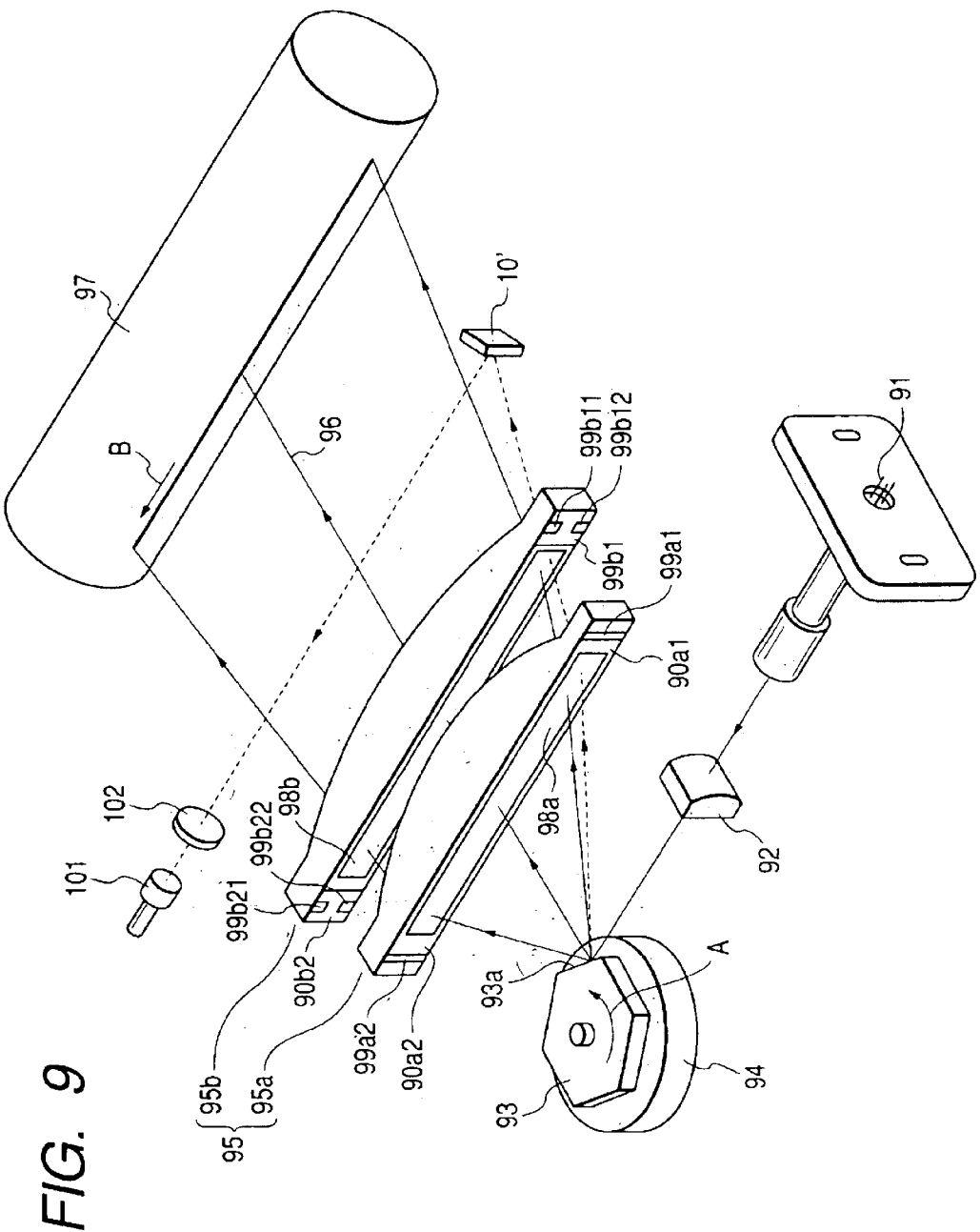
FIG. 9 is a schematic view showing the essential portions of an optical scanning apparatus according to the prior art.

FIG. 8 is a cross-sectional view of essential portions in the sub-scanning direction showing an embodiment of an image forming apparatus (electrophotographic printer) using the optical scanning apparatus according to any one of the aforedescribed Embodiments 1, 2 and 3.

In FIG. 8, reference numeral 104 designates the image forming apparatus. Code data Dc is inputted from an external device 117 such as a personal computer to this image forming apparatus 104. This code data Dc is converted into image data (dot data) Di by a printer controller 111 in the apparatus. This image data Di is inputted to an optical scanning unit 100. A light beam (beam) 103 modulated in conformity with the image data Di is emitted from the optical scanning unit (optical scanning apparatus) 100, and the photosensitive surface of a photosensitive drum 101 is scanned in the main scanning direction by the light beam 103.

The photosensitive drum 101 which is an electrostatic latent image bearing member (photosensitive member) is clockwisely rotated by a motor 115. With this rotation, the photosensitive surface of the photosensitive drum 101 moves relative to the light beam 103 in the sub-scanning direction orthogonal to the main scanning direction. Above the photosensitive drum 101, a charging roller 102 for uniformly charging the surface of the photosensitive drum 101 is provided so as to contact with the surface of the photosensitive drum. The light beam 103 scanned by the optical scanning unit 100 is adapted to be applied to the surface of the photosensitive drum 101 charged by the charging roller 102.

As previously described, the light beam 103 is modulated on the basis of the image data Di, and this light beam 103 is applied, whereby an electrostatic latent image is formed on the surface of the photosensitive drum 101. This electrostatic latent image is developed as a toner image by a developing device 107 disposed downstream of the applied position of the light beam 103 with respect to the direction of rotation of the photosensitive drum 101 so as to contact with the photosensitive drum 101.

The toner image developed by the developing device 107 is transferred onto a paper sheet 112 which is a transferring material by a transfer roller 108 disposed below the photosensitive drum 101 so as to be opposed to the photosensitive drum 101. Paper sheets 112 are contained in a sheet cassette 109 formed (rightward as viewed in FIG. 8) of the photosensitive drum 101, and can also be manually fed. A feed roller 110 is disposed at one end portion of the sheet cassette 109, and feeds the paper sheets 112 in the sheet cassette 109 into a conveying path.

The paper sheet 112 to which the unfixed toner image has been transferred in the manner described above is further conveyed to a fixing device rearward (leftward as viewed in FIG. 8) of the photosensitive drum 101. The fixing device comprises a fixing roller 113 having a fixing heater (not shown) therein, and a pressure roller 114 disposed so as to be brought into pressure contact with the fixing roller 113, and heats the paper sheet 112 conveyed thereto from the transferring portion while pressurizing it by the portion of pressure contact between the fixing roller 113 and the pressure roller 114, to thereby fix the unfixed toner image on the paper sheet 112. Further, discharge rollers 116 are disposed rearwardly of the fixing roller 113 and discharge the paper sheet 112 having the toner image fixed thereon out of the image forming apparatus.

Although not shown in FIG. 8, a printer controller 111 effects not only the conversion of the aforedescribed data but also the control of various portions in the image forming apparatus including a motor 115 and a polygon motor, etc. in the optical scanning unit 100.

According to the first invention, there can be achieved an optical scanning apparatus in which as previously described, a scanning lens is disposed so that a straight line linking the points on two positioning reference surfaces together or a plane formed by the points on three or more positioning reference surfaces may be non-orthogonal to the optical axis, whereby even if the effective portion (effective length) of the scanning lens differs relative to the optical axis or even if the shape in the main scanning cross-section is asymmetrical with respect to the optical axis, the scanning lens can be positioned highly accurately without the surface accuracy of the positioning reference surfaces being aggravated, whereby good images can always be obtained, and an image forming apparatus using the same.

According to the second invention, there can be achieved an optical scanning apparatus in which as previously described, a hollow portion is provided in a configurational portion outside the effective lens portion are of a scanning lens, and a positioning reference surface for effecting the positioning of the scanning lens in the direction of the optical axis is formed on a portion of the hollow portion, whereby the positioning reference surface can be freely disposed, whereby the degree of freedom of the dispositions of the scanning lens including the free disposition of the positioning reference surface such as the achievement of space saving can be enhanced, and an image forming apparatus using the same.

What is claimed is:

1. An optical scanning apparatus comprising deflecting means for deflecting a beam emitted from light source means, and scanning optical means having at least one scanning lens for causing the beam deflected by said deflecting means to be imaged on a surface to be scanned, wherein said at least one scanning lens constituting said scanning optical means has a hollow portion in at least one of configurational portions outside an effective lens portion of said scanning lens with the optical axis thereof interposed therebetween, and a positioning reference surface for effecting the positioning of said scanning lens in the direction of the optical axis is formed on said hollow portion.

2. An optical scanning apparatus according to claim 1, wherein said scanning lens does not have a hollow portion in the other configurational portion outside the effective lens portion with said optical axis interposed therebetween, and has a positioning reference surface on the other configurational portion outside the effective lens portion, and said positioning reference surface is formed on the same plane as said configurational portion.

3. An optical scanning apparatus according to claim 1, wherein said scanning lens has a concave surface, and said positioning reference surface is formed on the concave surface side of said scanning lens.

4. An optical scanning apparatus according to claim 1, wherein said positioning reference surface is formed on a surface opposite to an ejector pin.

5. An optical scanning apparatus according to claim 1, wherein said scanning lens is molded out of a plastic material.

6. An image forming apparatus comprising:

an optical scanning apparatus according to any one of claims 1 to 5;

a photosensitive member disposed on said surface to be scanned;

a developing device for developing an electrostatic latent image formed on said photosensitive member by the beam scanned by said optical scanning apparatus as a toner image;

a transferring device for transferring said developed toner image to a transferring material; and a fixing device for fixing the transferred toner image on the transferring material.

7. An image forming apparatus comprising:

an optical scanning apparatus according to any one of claims 1 to 5; and a printer controller for converting code data inputted from an external device into an image signal and inputting it to said optical scanning apparatus.

* * * * *